(12) United States Patent
Schnell et al.

(10) Patent No.: US 6,755,544 B2
(45) Date of Patent: *Jun. 29, 2004

(54) MIRROR ACTUATOR ELECTRICAL CONNECTOR

(75) Inventors: Robert E. Schnell, Holland, MI (US); David K. Willmore, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/274,805

(22) Filed: Oct. 21, 2002

(65) Prior Publication Data

US 2004/0012868 A1 Jan. 22, 2004

Related U.S. Application Data

(63) Continuation of application No. 09/812,434, filed on Mar. 20, 2001, now Pat. No. 6,467,920, which is a continuation of application No. 09/228,348, filed on Jan. 11, 1999, now Pat. No. 6,213,612.

(51) Int. Cl.$^7$ .............................................. G02B 7/182
(52) U.S. Cl. ...................................... 359/877; 439/352
(58) Field of Search ................................ 554/872, 877; 439/350, 352

(56) References Cited

U.S. PATENT DOCUMENTS

| | | |
|---|---|---|
| 4,403,829 A | 9/1983 | Thujiuchi et al. |
| 4,449,776 A | 5/1984 | Carmo et al. .............. 339/91 R |
| 4,544,871 A | 10/1985 | Suzuki ........................ 318/568 |
| 4,678,295 A | 7/1987 | Fisher |
| 4,815,837 A | 3/1989 | Kikuchi et al. .............. 359/874 |
| 4,880,393 A | 11/1989 | Moji ........................ 439/352 |
| 4,930,370 A | 6/1990 | Yoshida |
| 4,973,147 A | 11/1990 | Fujita et al. ................ 359/877 |
| 5,037,307 A * | 8/1991 | Ogasawara ................... 439/34 |
| 5,226,034 A | 7/1993 | Nagayama et al. ......... 359/872 |
| 5,238,214 A | 8/1993 | Syamoto et al. |
| 5,294,084 A | 3/1994 | Syamoto et al. |
| 5,311,368 A | 5/1994 | Tsuyama |
| 5,376,016 A | 12/1994 | Inaba et al. |
| 5,724,200 A | 3/1998 | Mochizuki .................. 359/877 |
| 5,900,999 A | 5/1999 | Huizenga et al. ........... 359/877 |
| 6,213,612 B1 | 4/2001 | Schnell et al. .............. 359/877 |
| 6,467,920 B2 * | 10/2002 | Schnell et al. .............. 359/877 |

FOREIGN PATENT DOCUMENTS

| | | |
|---|---|---|
| EP | 0290231 | 8/1990 |
| EP | 0278310 | 6/1993 |
| GB | 1391523 | 4/1975 |
| GB | 2297072 B | 4/1997 |
| GB | 2326238 | 12/1998 |
| WO | WO 9605080 | 2/1996 |

OTHER PUBLICATIONS

European Search Report dated Oct. 31, 2002, for related application Ser. No. 09/228,348, filed Jan. 11, 1999, now U.S. patent No. 6,213,612.

* cited by examiner

Primary Examiner—Mark A. Robinson
(74) Attorney, Agent, or Firm—Van Dyke, Gardner, Linn & Burkhart, LLP

(57) ABSTRACT

A vehicle exterior mirror actuator includes an actuator case, at least two electric motors, and a wire harness. The wire harness includes a connector and a plurality of wires terminated at the connector. The connector includes at least three electrical terminals electrically interconnected with the wires. When the connector is joined with the actuator case, one of the terminals of the connector makes direct contact with one of the terminals of one of the motors and a second of the connector terminals makes direct contact with the corresponding terminal of the other motor. The third connector terminal makes electrical contact with the other two corresponding terminals of the motors to provide a common electrical path for the other two corresponding terminals.

23 Claims, 6 Drawing Sheets

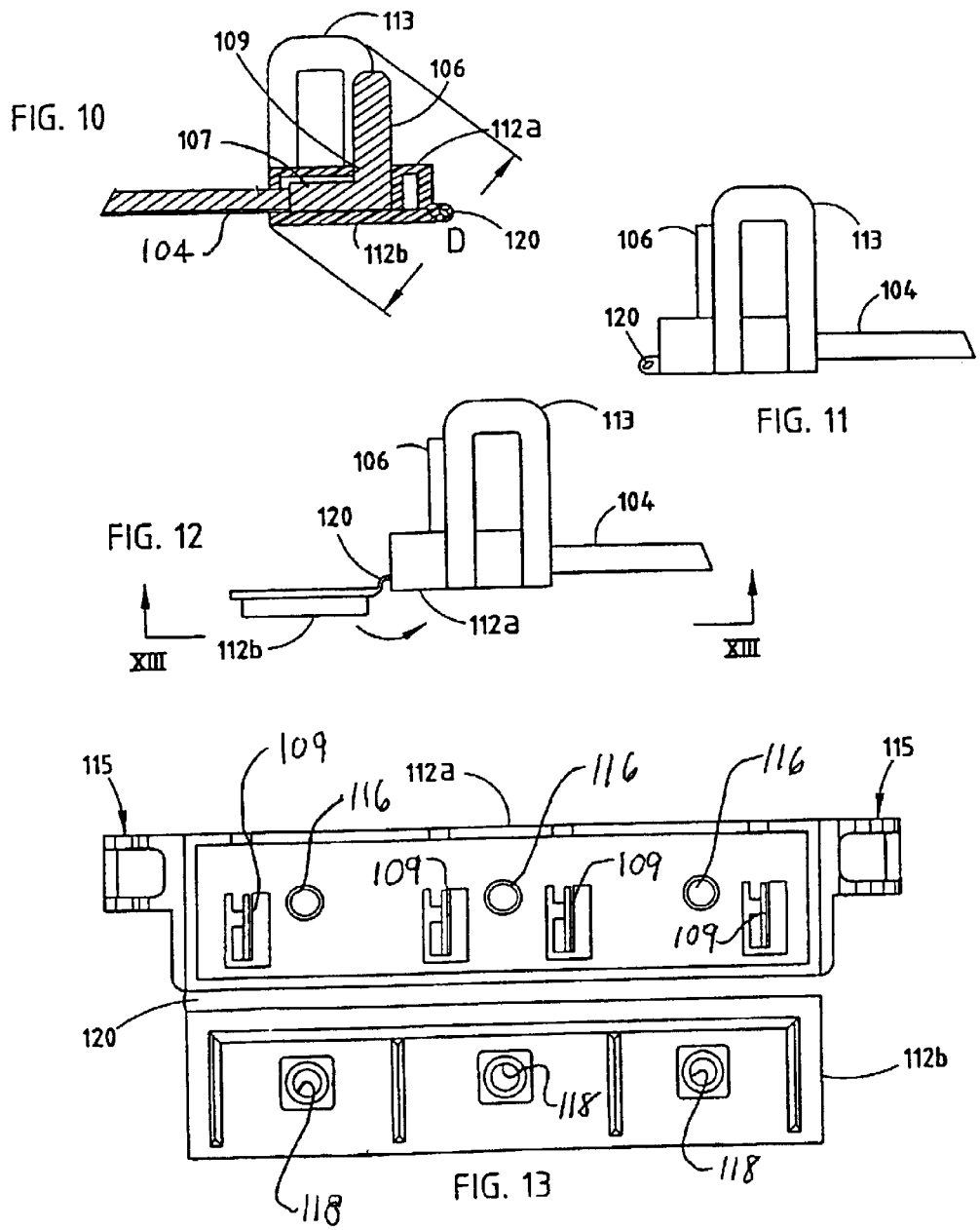

MIRROR ACTUATOR ELECTRICAL CONNECTOR

This application is a continuation application of application Ser. No. 09/812,434 filed on Mar. 20, 2001, by Robert E. Schnell and David K. Willmore, entitled MIRROR ACTUATOR ELECTRICAL CONNECTOR, now U.S. Pat. No. 6,467,920, which is a continuation application of application Ser. No. 09/228,348, filed Jan. 11, 1999, now U.S. Pat. No. 6,213,612, which are incorporated by reference in their entireties herein.

BACKGROUND OF THE INVENTION

The present invention is related to a vehicular exterior mirror assembly and, in particular, to an electrical connector arrangement for delivering electrical current to mirror positioning actuator motors in such exterior mirror assembly.

Vehicle exterior mirrors are remotely positionable by an actuator assembly. Such actuator assembly typically includes two motors, each for rotating the mirror with respect to one of two generally orthogonal axes. Various techniques have been proposed for supplying electrical current to the two motors in order to independently actuate the motors in either a forward or reverse rotational direction. It is common to provide a hollow pivot post that pivotally mounts the mirror assembly to the vehicle, in order to provide a breakaway feature whereby the mirrors may be knocked out of position without damaging the mirror mounting or which may be folded by yet another motor into a foldaway position. It is known to have a wiring harness pass through the central opening of the pivot post and be terminated at one or more electrical connectors for connecting with the actuator assembly. A difficulty with the prior art is that the connector bodies used to electrically interface the wiring harness with the actuator case terminals have been too large to pass through the opening in the pivot post pivotally mounting the mirror assembly. Therefore, it has been necessary to leave the other end of the wire harness not terminated to thereby pass through the opening in the pivot post. This requires a subsequent step of terminating the other end of the wiring harness which is a labor intensive operation that must take place after the mirror has been assembled. On mirror assemblies that are not foldable, it is still necessary to pass the wires through an opening passing to the vehicle.

In a proposed actuator, the connectors are made up of electrical terminals staked onto the wires and then slidably received within complimentary slots in the connector body. Such arrangement has not been entirely satisfactory. The connector body must be made relatively large in order to provide sufficient rigidity to the terminals held in this manner. Furthermore, the assembly of the terminal to the connector body is relatively labor intensive and conducive to automated assembly. Furthermore, the retention of the terminals in the connector body is of questionable strength.

In order to retain the connector to the case of the actuator, resilient clips are provided on the connector body which engage openings in the actuator case. Thus, a force pushing the connector body towards the actuator case will cause the terminals of the connector to engage terminals of the case and will ultimately cause an engagement of the spring resilient clips with the openings in the actuator case. While such arrangement is intended to hold the connector in place against the actuator case, the connector can be readily dislocated by a pulling on the wire harness. Therefore, an extra stay is provided to hold the wiring harness against the actuator case to reduce the likelihood that the wires will be pulled sufficiently to dislocate the connector bodies from the case.

Another difficulty with such arrangement is that it necessitates the placement of openings in the actuator case. Because the actuator is exposed to environmental conditions, namely moisture, road splash, and the like, the existence of openings in the case provides a quality difficulty with the known connector engagement mechanism. In order to overcome the difficulty, the prior art has proposed configuring the connector to provide a sealing interface between the connector body and the case. While such arrangement may reduce the amount of moisture entering the case, it cannot entirely preclude such penetration.

Another difficulty with prior actuator assemblies is the necessity to provide electrical conductors from terminals on the actuator case to the electrical motors therein. It is common to use metal banding to attach the internal conductors to the external terminals which technique is prone to a high incident of poor conductivity and even mechanical failure. Several proposals have been made to replace the banding procedures of the prior art. One proposal is disclosed in commonly assigned patent application Ser. No. 08/780,996 filed Jan. 9, 1997, for a HOUSING WITH INTEGRAL CONNECTOR FOR REARVIEW MIRROR ACTUATOR ASSEMBLY, the disclosure of which is incorporated herein by reference. However, even the proposals provided therein require a separate step of applying conductors to the actuator case.

SUMMARY OF THE INVENTION

The present invention provides a vehicular exterior mirror assembly which eliminates the drawbacks of the prior art. According to an aspect of the invention, the mirror assembly includes an actuator having a case and at least two electric motors supported by the case and connected with a reflective element to provide adjustment to the reflective element with respect to at least two axes. A wiring harness is provided having a connector and a plurality of wires terminated at the connector. The connector includes at least three electrical connector terminals electrically interconnected with the wires. When the connectors join with the actuator case, the connector terminals make direct contact with corresponding receiving terminals of the electrical motors. In this manner, the necessity for electrical connectors within the actuator casing is substantially eliminated and both motors are supplied from one connector. Importantly, this eliminates the necessity for the banding of conductors to the motor terminals and the attendant labor expenses and failure mode associated therewith. It also avoids potential misconnection resulting from use of more than one connector to feed the motors.

According to another aspect of the invention, a vehicular exterior mirror assembly includes an actuator having a case and at least two electric motors supported by the case and connected with a reflective element to provide adjustment to the reflective element with respect to two axes. A wiring harness is provided having a connector and a plurality of wires terminated at the connector. The connector includes a plurality of electrical connector terminals electrically interconnected with the wires and adapted to be joined with the actuator case. The connector includes a body defined by two facing portions that capture portions of the connector terminals between the two facing portions. This configuration provides exceptionally secure mechanical support for the terminals by the connector body. This is accomplished in a manner which is easy to assemble and is adapted to automatic assembling techniques. In particular, the connector terminals may be supported by application from above one of the facing portions with the other facing portion then being placed above the connector terminals thereby holding the terminals in place. Preferably, the two portions are integrally molded and define a living hinge. The portions may be joined in facing relationship by known techniques, such as cold staking, heat staking, snap welding, sonic welding and adhesive bonding.

According to another aspect of the invention, a vehicular exterior mirror assembly includes an actuator having a case and at least two electric motors supported by the case and connected with a reflective element to provide adjustment to the reflective element with respect to the two axes. A wiring harness is provided having a connector and a plurality of wires terminated at the connector. The connector includes a plurality of electrical connector terminals electrically interconnected with the wires and adapted to be joined with the actuator case. Complimentary retention members on the connector and the actuator case engage to retain the connector with the actuator case. The retention members are positively engaged, thus requiring motion other than a separating motion between the connector and the actuator case to disengage the retention members. This provides an exceptionally strong mechanical bond between the connector and the actuator case. Preferably, the retention member includes a pair of ears on one of the connector and the actuator case which engage features protruding from the other of the connector and the actuator case.

Accordingly to yet another aspect of the invention, a vehicular exterior mirror assembly includes an actuator having a case and at least two electrical motors supported by the case and connected with a reflective element to provide adjustment to the reflective element with respect to at least two axes. The assembly further includes a wiring harness having a connector and a plurality of wires terminated at the connector. The connector includes a plurality of electrical connector terminals electrically interconnected with the wires and adapted to be joined with the actuator case. The mirror assembly housing defines an internal passage therethrough. The electrical connector has a cross-section width dimension that is less than the cross section of the internal passage of the mirror assembly housing. This allows the connector to be passed through the opening during assembly of the mirror assembly. In this manner, both ends of the wiring harness can be terminated in electrical connectors prior to assembly to the mirror assembly and the connector which joins with the actuator case can be passed through the opening in order to interconnect the actuator with the vehicle electrical system. This is exceptionally efficient in assembly of the mirror assembly. By allowing both ends of the wiring harness to be terminated in connectors ahead of time, the wiring harness is adapted to be manufactured using automated techniques.

These and other objects, advantages, and features of this invention will become apparent upon review of the following specification in conjunction with the drawings.

BRIEF DESCRIPTION OF THE DRAWINGS

FIG. 10 is a sectional view taken along the lines X—X in FIG. 8;

FIG. 11 is an end elevation taken along the lines XI—XI in FIG. 8;

FIG. 12 is the same view as FIG. 11 illustrating the portions of the connector in their unassembled position for receiving electrical terminals therein; and FIG. 13 is a view taken along the lines XIII—XIII in FIG. 12.

DESCRIPTION OF THE PREFERRED EMBODIMENT

Figure 1:
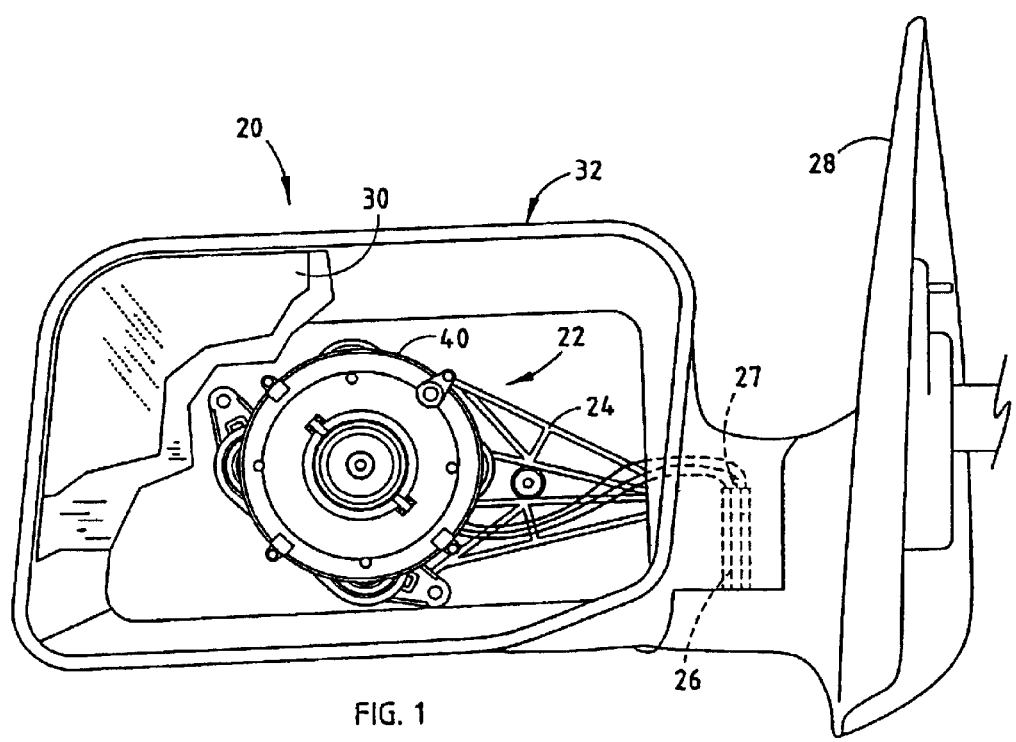
FIG. 1 is a rear elevation looking forward with respect to the vehicle, of an exterior mirror assembly according to the invention, with a portion of the reflective element removed to reveal internal features thereof.

Referring now specifically to the drawings, and the illustrative embodiments depicted therein, a vehicular exterior mirror assembly 20 includes an actuator 22, which is mounted by a bracket 24 through a pivot post 26 to a portion 28 of a vehicle (FIG. 1). A mirror reflective element 30 is supported by actuator 22 in a manner that provides adjustability to the plane of the mirror element about two axes which are generally aligned with earth's vertical and horizontal axes (not shown). Mirror element 30 may be an electro-optic mirror element capable of a partial reflectance level such as an electrochromic mirror element or may be a non-electro-optic mirror element, such as a chrome mirror or the like. Pivot post 26 provides a breakaway feature of mirror assembly 20 such that engagement with a fixed or moveable object will tend to result in folding of the mirror forwardly and rearwardly rather than destruction of the mirror. However, pivot post 26 could also provide a fold-away feature to mirror assembly 20 such that the mirror assembly can be folded close to the vehicle body by a motor (not shown) in response to actuation by an actuator as is known in the art. A housing 32 generally surrounds actuator 22 and bracket 24 and is also attached to pivot post 26 or to bracket 24. Pivot post 26 is hollow including a through-opening 27 through its pivot axis.

Figure 2:
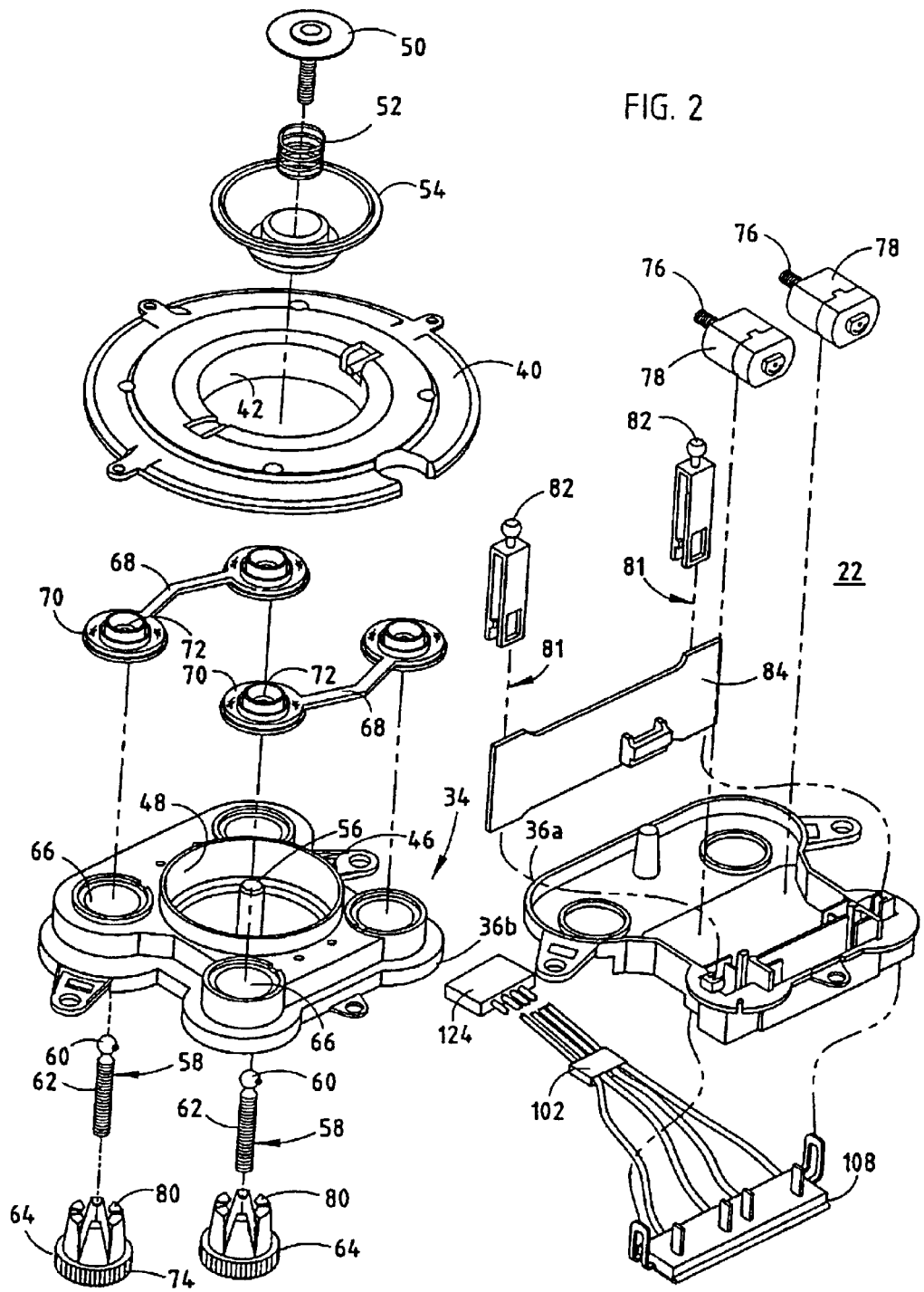
FIG. 2 is an exploded perspective view of an actuator and wiring harness according to the invention.
Figure 3:
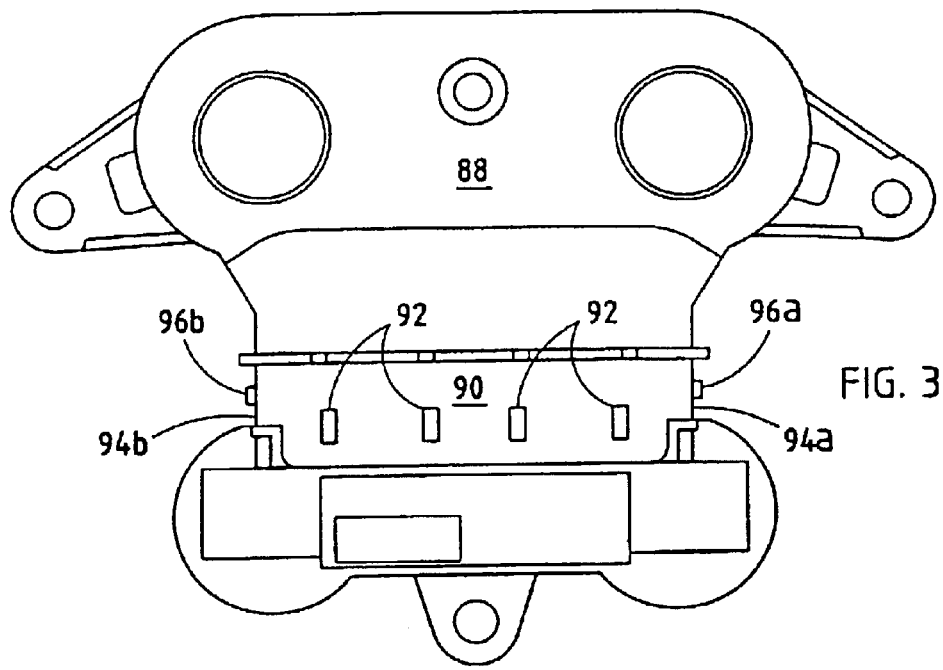
FIG. 3 is a bottom plan view of an actuator illustrating features of the case which are engageable with a wiring harness according to the invention.
Figure 4:
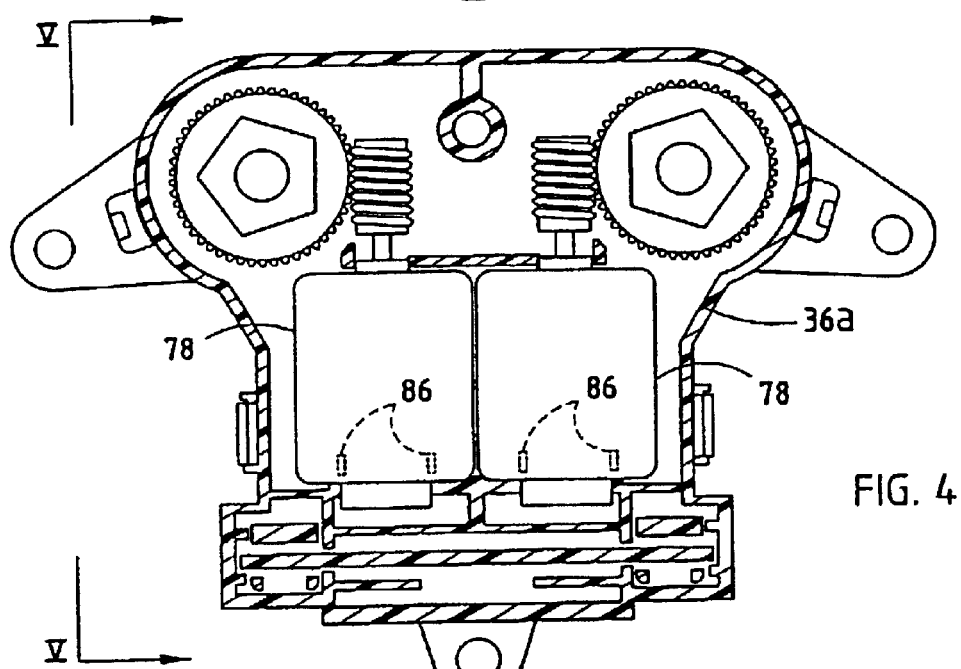
FIG. 4 is a top plan view of an actuator with a portion of the case removed to reveal internal features thereof.
Figure 5:
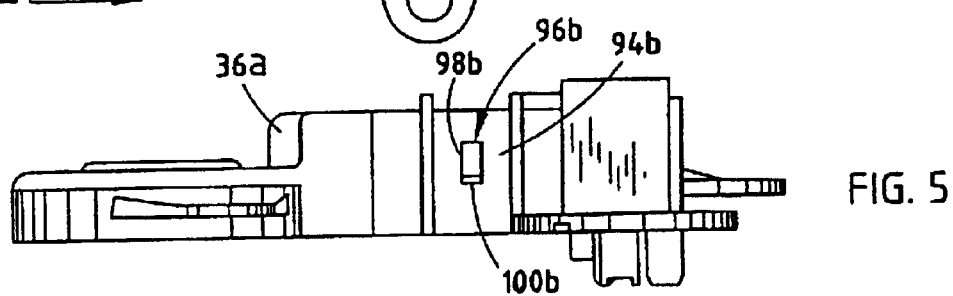
FIG. 5 is a side elevation taken along the lines V—V in FIG. 4.
Figure 6:
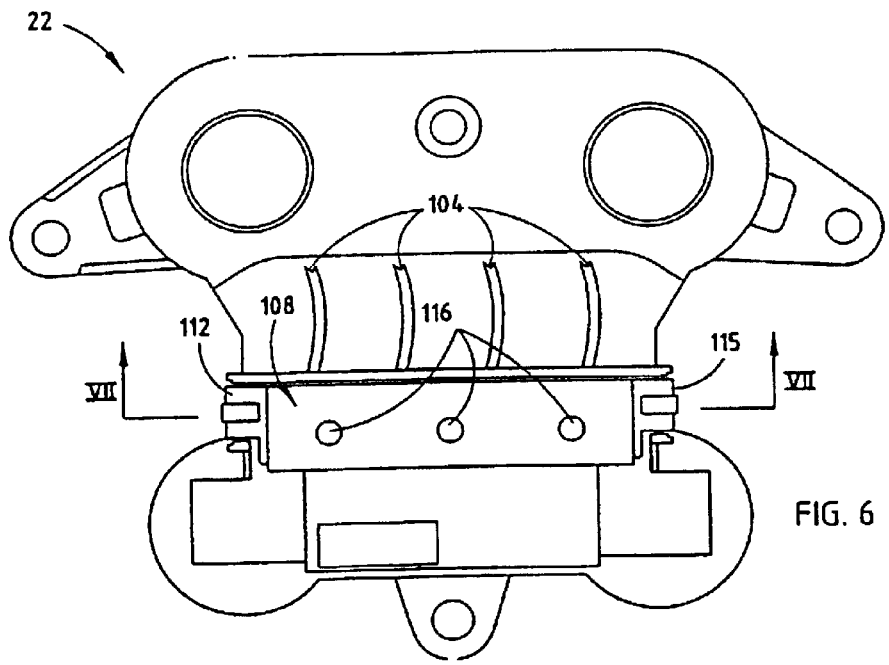
FIG. 6 is the same view as FIG. 3 with a wiring harness and connector attached to the actuator case.
Figure 7:
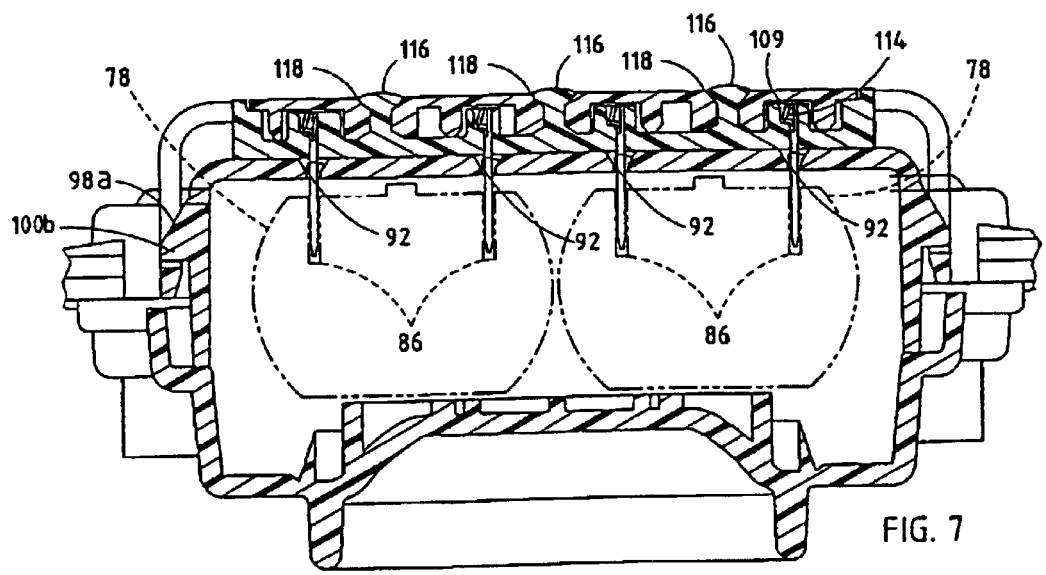
FIG. 7 is a sectional view taken along the lines VII—VII in FIG. 6.

Actuator 22 includes a case 34 made up of complimentary case portions 36a and 36b (FIG. 2). A mirror mounting flange 40 is pivotally positionable with respect to case 34 in a manner which is described in copending application Ser. No. 09/047,846 filed Mar. 25, 1998, by Robert E. Schnell for a PIVOT SUPPORT FOR ADJUSTABLE REARVIEW MIRROR, the disclosure of which is hereby incorporated herein by reference. Suffice it to say, mounting flange 40 includes an outer conical surface (not shown) on a portion 42 which is in slidable contact with an edge 46 defined by a generally cylindrical wall 48 of case portion 36b. Mirror mounting flange 40 is biased into moveable engagement with case 34 by a fastener 50 and spring biasing member 52 which biases a retention cup 54 in the direction of case 34 by engagement with a post 56 extending from case portion 36b.

Mirror mounting flange 40 is rotated independently about two generally orthogonal axes by a pair of screw jacks 58. Each screw jack has a ball 60 which is received within a socket (not shown) of mirror mounting flange 40 and a threaded shaft 62 which threadably engages an internal thread 80 of a rotatable nut member 64. An opening 66 through which screw jack 58 extends is sealed by a gasket member 68 having a seal 70 overlying opening 66. Each seal 70, in turn, has an opening 72 through which ball 60 can protrude. Each nut member 64 includes an external ring 74 having gear teeth formed thereon which is rotatably engaged with a worm gear 76 of an electric DC motor 78. In this manner, rotation of worm gear 76 by motor 78 rotates nut member 64 which extends or retracts screw jack 58 by threadable engagement between threaded shaft 62 and internal threads 80 on nut member 64. Although the above is a preferred mechanism for pivotably positioning the mirror mounting flange with respect to the case, other mechanisms known in the art may also be used.

If mirror assembly 20 is a memory mirror which is capable of being repositioned to positions stored in a memory device, as is known in the art, actuator 22 may additionally include a pair of linear position transducers 81. In the illustrated embodiment, transducers 81 are made up of an actuator 82 which slidably engages a set of carbon traces (not shown) on a circuit board 84 mounted to case portion 36a. In this manner, as each motor 78 positions mirror mounting flange 40 about its associated axis, the position of the mirror-mounting flange with respect to that axis is monitored by the corresponding linear position transducer 81. The details of linear transducers 81 are disclosed in detail in application Ser. No. 09/228,579, filed concurrently with the present application by David Willmore and Robert Schnell for a VEHICLE MEMORY MIRROR POSITION TRANSDUCER, now U.S. Pat. No. 6,094,027, the disclosure of which is hereby incorporated herein by reference. However, other forms of position transducers known in the art may be used if a memory mirror function is desired. Movable components of actuator 22 may be lubricated with a suitable lubricant, such as a synthetic hydrocarbon with lithium soap marketed by NYE Lubricants under Model No. Rheolube 361, or the like.

Motors 78 each include a pair of female terminals 86 which supply electrical energy to operate motors 78 (FIGS. 4–7). In the illustrated embodiment, terminals 86 are recessed female terminals but could, alternatively, be male terminals protruding from the housing of motors 78. Housing portion 36a has an outer surface 88 which defines a connector-engaging portion 90. A series of openings 92 are formed in connector-engaging portion 90. Openings 92 are generally aligned with terminals 86 such that a male terminal inserted in an opening 92 will engage a corresponding female terminal 86. Connector-engaging portion 90 has a pair of side portions 94a and 94b, each of which extends generally at right angles to connector-engaging portion 90 of outer surface 88. A pair of retention members 96a, 96b protrude from respective side portions 94a, 94b. Each retention member includes a camming surface 98a, 98b and a retention surface 100a, 100b.

Mirror assembly 20 further includes a wire harness 102 which is made up of a plurality of wires 104, each of which is electrically and mechanically joined with an electrical terminal 106 of a connector assembly 108. Connector assembly 108 includes a body 110 made up of two facing body portions 112a, 112b. Body portion 112a includes a plurality of recesses 114 which are configured to conform to a base portion 107 of terminal 106. Each recess is juxtaposed with an opening 109 that penetrates body portion 112 such that the terminal 106 may extend from the connector body. Each terminal base portion 107 is inserted into one of the recesses 109 and retained therein when the body portion 112b is joined with body portion 112a. This is accomplished by joining the body portions by known relationships, such as cold staking, heat staking, snap welding, sonic welding, adhesive bonding, or the like. To assist in the bonding, one or more posts 116 extend from either body portion 112a or 112b and are tightly received in a corresponding opening 118 in the opposite body portion 112a, 112b. Post 118 provides an additional surface area for use in joining the connector portions together and may be deformed during the joining process to further retain the body portions together. As can be seen by reference to FIG. 9, because each contact base portion 107 is captured between body portion 112a and 112b, the terminal is resistant to being pulled out of its mooring in the connector. Advantageously, body portions 112a and 112b may be formed together in a single piece by a living hinge including a hinge portion 120 such that, prior to assembly, the body portions 112a and 112b are generally coplanar, as illustrated in FIGS. 12 and 13, and, after assembly, the body portions are in facing relationship, as illustrated in FIGS. 8–11. In the illustrated embodiment, body 110 is made from polyester plastic but other known plastics may be used.

A pair of retention members 115, shown as ears, extend from body portion 108 and engage with respective retention members 96a and 96b on case portion 36a. Each retention member 115 has an outer frame 113 surrounding a central opening 114 therein. The solid frame 113 of retention member 115 slides over respective camming surfaces 98a, 98b as connector assembly 108 is joined with casing 36. Because retention members 115 are flexible, they expand outward under the action of camming surfaces 98a, 98b and may be captured by retention surface 100 thereby mechanically retaining the connector in position against casing 36. Retention members 115 may be made resilient so that they snap into alignment with retention surfaces 100. Alternatively, they could be flexible yet require movement into position with retention surfaces 100a, 100b either by finger motion or by using a tool. However, it is seen that the engagement between retention members 115 and retention members 96a, 96b provide complimentary retention members which positively retain a connector on the actuator case such that the connector is not prone to being pulled off of the case merely by pulling on wires 104. Instead, a positive disengagement motion on retention members 115 is required in order to remove the connector from the case. The retention members could be configured such that a tool is required to dislodge the ears from the retention member. Alternatively, they could be configured that finger motion is all that is necessary to dislodge the retention members. Either way, the engagement between the connector assembly and the case is secure. It should be apparent that retention members 115 could be positioned on case 34 and retention members 96a, 96b on connector body 108.

Figure 8:
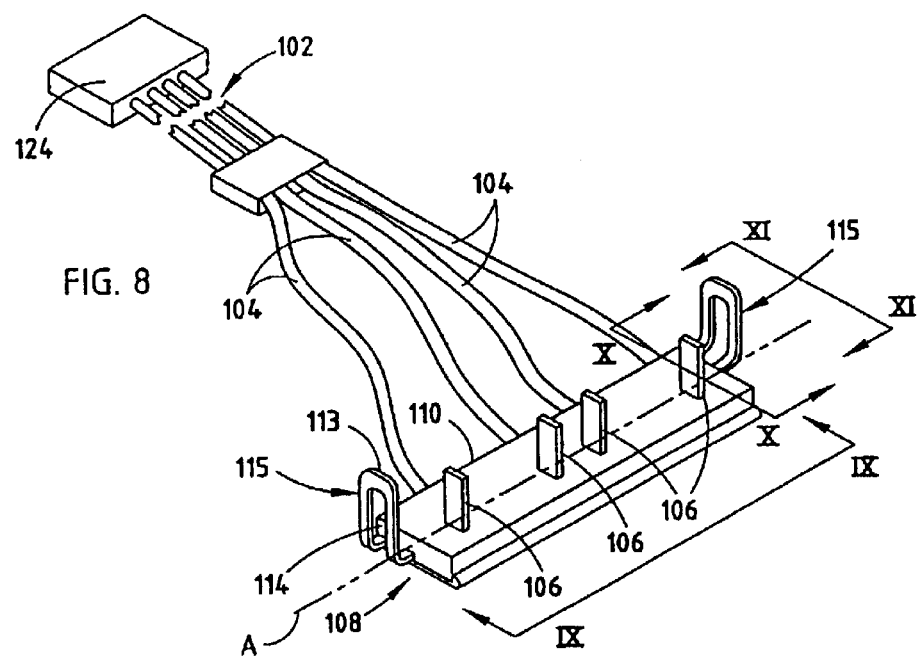
FIG. 8 is a perspective view of a wiring harness according to the invention.
Figure 9:
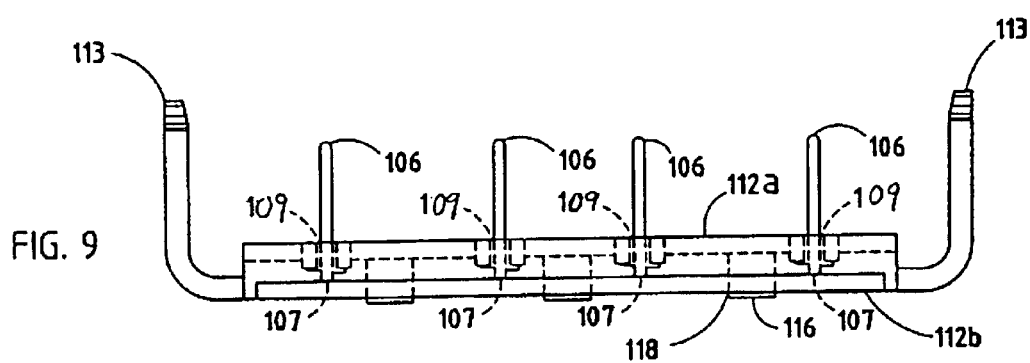
FIG. 9 is an end elevation taken along the lines IX—IX in FIG. 8.

Connector body 108 has a maximum cross-sectional dimension D shown in FIG. 10 that is perpendicular to its long axis A seen in FIG. 8. In this manner, connector assembly 108 can be fit through a circular opening having a diameter at least somewhat greater than the dimension D. Because of the unique configuration of connector 108, dimension D can be made smaller than cross-section dimensions of central opening 27 through pivot post 26 so that connector assembly 108 can be fit through central opening 27 of pivot post 26. This allows wiring harness 102 to be fully assembled to connector 124 on the opposite ends of wires 104 prior to assembly of the exterior mirror assembly. This advantageously allows the wiring harness to be inserted in position extending from vehicle portion 28 to actuator 22 through pivot post 26 after both ends of wiring harness 102 are terminated with connectors. This is advantageous during assembly of the vehicle exterior mirror assembly because wiring harness 102 may be assembled to the mirror assembly after it has been assembled merely by the insertion of connector assembly 108 through the opening in pivot post 26 without the need for subsequent termination of individual wires 104.

Connector assembly 108 has, preferably, four terminals for individually connecting to both motors 78. Two of the terminals can, if desired, be fed by a common ground or power lead. Alternatively, connector 108 could have three terminals for connecting with both motors 78, one of the terminals being a common ground or a common power lead to both motors. Advantageously, this simultaneous connection to both motors 78 reduces the number of connections that must be made during assembly of the vehicle and reduces the ability to misconnect the wiring harness to the actuator. Advantageously, connector assembly 108 is retained to case 36 by retention members that do not penetrate the case. Because every opening into the case is a potential source of moisture leakage, this feature enhances the moisture resistance of the actuator case. Because terminals 106 connect directly with terminals on the motor, the need for an internal wiring harness in case 36 is eliminated.

Connector assembly 108 securely retains terminals 106 in the connector body by retaining a base 107 of each terminal 106 between opposing housing portions which are fixedly joined together. This greatly enhances the securing of each terminal within the connector. Furthermore, because the terminals are inserted through openings in a connector portion, the connector is adapted to automated assembly techniques.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicular exterior mirror actuator assembly for adjustably positioning a reflective element, said mirror actuator assembly comprising:

an actuator having an actuator case and at least first and second electric motors, said first electric motor including a first electrical terminal and a second electrical terminal, and said second electric motor including a third electrical terminal and a fourth electrical terminal;

a wire harness having a connector and a plurality of wires terminated at said connector, said connector including at least three electrical connector terminals electrically interconnected with said wires;

said connector joined with said actuator case by at least one retention member, said retention member being captured by said actuator case to positively engage said connector with said actuator case, one connector terminal of said at least three connector terminals making direct contact with said first terminal of said first electric motor, a second connector terminal of said at least three connector terminals making direct contact with said third terminal of said second electric motor, and a third connector terminal of said at least three connector terminals making electrical contact with said second and fourth terminals of said first and second electric motors to provide a common electrical lead for said at least first and second electric motors; and said connector comprising two body portions joined in facing relationship, and said two body portions capturing said wires therebetween, and said body portions being joined by a living hinge.

2. The mirror actuator assembly according to claim 1, wherein each of said first and third terminals of said first and second electric motors comprises a power terminal, wherein said third connector terminal provides a common ground lead for said at least first and second electric motors.

3. The mirror actuator assembly according to claim 1, wherein said at least one retention member comprises a pair of retention members.

4. The mirror actuator assembly according to claim 3, wherein said case includes complementary retention members engaged by said retention members of said connector when said connector is joined with said actuator case.

5. The minor actuator assembly according to claim 4, wherein said actuator case includes an exterior surface, said complementary retention members of said actuator case provided at said exterior surface wherein said retention members of said connector do not penetrate said actuator case when joined with said actuator ease.

6. The mirror actuator assembly according to claim 4, wherein said complementary retention members of said actuator case protrude from said exterior surface of said actuator case.

7. The mirror actuator assembly according to claim 6, wherein each of said retention members of said connector comprises an outer frame surrounding a central opening, said outer frames of said retention members extending around said complementary retention members of said vase when said connector is joined with said case to thereby mechanically retain said connector in position against said case.

8. The mirror actuator assembly according to claim 7, wherein said retention members comprise resilient retention members arid provide a snap alignment with said complementary retention members of said actuator case.

9. The mirror actuator assembly according to claim 4, wherein each of said complementary retention members of said actuator case includes a camming surface, said camming surfaces urging said retention members of said connector to expand outwardly when said connector is joined with said case, and said retention members substantially returning to a pre-installed configuration when said retention members of said connector are moved passed said camming surfaces.

10. The mirror actuator assembly according to claim 9, wherein each of said complementary retention member includes an engagement surface, each of said retention members of said connector including an engagement surface, and said engagement surfaces of said retention members of said actuator case and said connector being generally parallel when said connector is fully engaged with said actuator case.

11. The mirror actuator assembly according to claim 3, wherein said retention members comprise flexible retention members, said retention members initially expanding outwardly when said connector is joined with said case, and said retention members engaging an exterior surface of said case when fully engaged with said case to thereby retain said connector joined with said case without penetrating said case.

12. The mirror actuator assembly according to claim 1, wherein said terminals of said motors comprise female terminals.

13. The minor actuator assembly according to claim 1, wherein said two body portions are joined in facing relationship by one of cold staking, heat staking, snap welding, sonic welding, and adhesive bonding.

14. A vehicular exterior mirror actuator assembly for adjustably positioning a reflective element, said mirror actuator assembly comprising:

an actuator having an actuator case and at least one electric motor, said actuator being adapted to provide adjustment to a reflective element having a rearward field of view in order to adjust the rearward field of view, and said case including an exterior surface and opposed sides, each side having a retention member;

a wire harness having a connector and a plurality of wires terminated at said connector, said connector including a corresponding plurality of connector terminals electrically interconnected with said wires; and said connector having at least two flexible retention members for engaging said retention members of said actuator case, said retention members of said actuator case urging said flexible retention members to expand outwardly when said connector is initially mounted on said actuator case, said retention members of said connector positively engaging said retention members of said actuator case wherein said connector straddles said actuator case when said connector is joined with said actuator case to thereby retain said connector joined with said actuator case without penetrating said case, and at least one of said connector terminals making direct contact with a terminal of said electric motor when said connector is joined with said case.

15. The mirror actuator assembly according to claim 14, wherein each of said flexible retention members comprise an outer frame surrounding a central opening, said outer frames surrounding at least a portion of said retention members of said actuator case when said connector is joined with said actuator case.

16. The mirror actuator assembly according to claim 14, wherein said connector comprises two body portions joined in facing relationship, and said wires being captured between said two body portions.

17. The mirror actuator assembly according to claim 16, wherein said body portions are joined by a living hinge.

18. The mirror actuator assembly according to claim 16, wherein said body portions are joined in facing relationship by one of cold staking, heat staking, snap welding, sonic welding, and adhesive bonding.

19. The mirror actuator assembly according to claim 14, wherein said at least one electric motor comprises at least a first electric motor and a second electric motor, said first electric motor including a first terminal and a second terminal, staid second electric motor including a third terminal and a fourth terminal, said connector including at least three electrical connector terminals electrically interconnected with said wires, a first connector terminal of said at least three connector terminals making direct contact with said first terminal of said first electric motor, and a second connector terminal of said at least three connector terminals making direct contact with said third terminal of said second electric motor when said connector is joined with said case.

20. The mirror actuator assembly according to claim 19, wherein a third connector terminal of said at least three connector terminals makes electrical contact with said second and fourth terminals of said first and second electric motors to provide a common electrical lead for said motors when said connector is joined with said case.

21. The mirror actuator assembly according to claim 19, wherein each or said first and third terminals comprise power terminals, wherein said third connector terminal provides a common ground lead for said first and second electric motors.

22. A vehicular exterior actuator assembly for adjustably positioning a reflective element, said mirror actuator assembly comprising:

an actuator having an actuator case and at least first and second electric motors, said first electric motor including a first electrical terminal and a second electrical terminal, and said second electric motor including a third electrical terminal and a fourth electrical terminal;

a wire harness having a connector and a plurality of wires terminated at said connector said connector including at least three electrical connector terminals electrically interconnected with said wires;

said connector joined with said actuator case by at least one retention member, said retention member being captured by said actuator case to positively engage said connector with said actuator case, one connector terminal of said at least three connector terminals making direct contact with said first terminal of said first electric motor, a second connector terminal of said at least three connector terminals making direct contact with said third terminal of said second electric motor, and a third connector terminal of said at least three connector terminals making electrical contact with said second and fourth terminals of said first and second electric motors to provide a common electrical lead for said at least first and second electric motors; and said actuator case including an exterior surface, said at least one retention member comprising a pair of retention members, and said actuator case including complimentary retention members engaged by said retention members of said connector when said connector is joined with said actuator case, said complimentary retention members of said actuator case provided at said exterior surface wherein the retention members of said connector do not penetrate said actuator case when joined with said actuator case, and said actuator case having opposed sides, said complimentary retention members of said actuator case provided at said opposed sides wherein said connector straddles said actuator case when said connector is joined with said actuator case.

23. The mirror actuator assembly according to claim 22, wherein said connector terminals are generally aligned between said retention members.

* * * * *

UNITED STATES PATENT AND TRADEMARK OFFICE
CERTIFICATE OF CORRECTION

PATENT NO. : 6,755,544 B2  Page 1 of 1
APPLICATION NO. : 10/274805
DATED : June 29, 2004
INVENTOR(S) : Robert E. Schnell and David K. Willmore It is certified that error appears in the above-identified patent and that said Letters Patent is hereby corrected as shown below:

Column 8:
Line 7, Claim 1, Delete "and" after "relationship,".
Line 22, Claim 5, "minor" should be --mirror--.
Line 27, Claim 5, "ease" should be --case--.
Line 36, Claim 7, "vase" should be --case--.
Line 42, Claim 8, "arid" should be --and--.

Column 9:
Line 4, Claim 13, "minor" should be --mirror--.
Line 55, Claim 19, "staid" should be --said--.

Column 10:
Line 11, Claim 21, "or" should be --of--.
Line 15, Claim 22, Insert --mirror-- after "exterior".

Signed and Sealed this

Tenth Day of February, 2009

JOHN DOLL
*Acting Director of the United States Patent and Trademark Office*